United States Patent
Holloway

(10) Patent No.: US 11,578,971 B2
(45) Date of Patent: Feb. 14, 2023

(54) ULTRASONIC TESTING USING A PHASED ARRAY

(71) Applicant: HOLLOWAY NDT & ENGINEERING INC., Georgetown (CA)

(72) Inventor: Paul Holloway, Georgetown (CA)

(*) Notice: Subject to any disclaimer, the term of this patent is extended or adjusted under 35 U.S.C. 154(b) by 104 days.

(21) Appl. No.: 17/174,557

(22) Filed: Feb. 12, 2021

(65) Prior Publication Data
US 2022/0260366 A1     Aug. 18, 2022

(51) Int. Cl.
```
G01N 29/04    (2006.01)
G01N 29/22    (2006.01)
G01N 29/11    (2006.01)
G01N 29/24    (2006.01)
G01B 17/02    (2006.01)
```

(52) U.S. Cl.
CPC ........... *G01B 17/02* (2013.01); *G01N 29/043* (2013.01); *G01N 29/048* (2013.01); *G01N 29/11* (2013.01); *G01N 29/223* (2013.01); *G01N 29/2487* (2013.01); *G01N 2291/02854* (2013.01); *G01N 2291/044* (2013.01)

(58) Field of Classification Search
CPC .... G01B 17/02; G01N 29/043; G01N 29/048; G01N 29/11; G01N 29/223; G01N 29/2487; G01N 2291/02854; G01N 2291/044
USPC .......................................................... 73/597
See application file for complete search history.

(56) References Cited

U.S. PATENT DOCUMENTS

| | | | |
|---|---|---|---|
| 4,513,384 A * | 4/1985 | Rosencwaig | G01B 11/0633 374/134 |
| 6,848,313 B2 | 2/2005 | Krieg et al. | |
| 7,328,618 B2 * | 2/2008 | Hunaidi | G01N 29/07 73/598 |
| 7,784,347 B2 | 8/2010 | Messer et al. | |

(Continued)

FOREIGN PATENT DOCUMENTS

| | | |
|---|---|---|
| DE | 102020100118 A1 * | 7/2021 |
| EP | 2487488 | 8/2012 |

(Continued)

OTHER PUBLICATIONS

Canadian Examiner's Report dated Mar. 18, 2022.

*Primary Examiner* — Jacques M Saint Surin
(74) *Attorney, Agent, or Firm* — KPIP Law, PLLC

(57) ABSTRACT

A method of testing for thickness loss in a metal wall is disclosed. The method includes mounting a first and a second ultrasonic transducer to the metal such that the transducers are in ultrasonic communication along a beam line and moving the first and second ultrasonic transducers along a scan line. A series of composites of received signal measurements are obtained by, at multiple locations along the scan line, using the first ultrasonic transducer to transmit ultrasonic signals through the metal wall along the beam line at a plurality of transmission angles and obtaining composites of received signal amplitudes by combining signal amplitudes measured by the second ultrasonic transducer. The series of composites are input into a predetermined relationship to obtain a thickness profile indicative of a proportion of remaining wall thickness. The predetermined relationship is experimentally obtained to characterize a given metal wall of nominal thickness.

19 Claims, 9 Drawing Sheets

(56) References Cited

U.S. PATENT DOCUMENTS

| | | | |
|---|---|---|---|
| 8,265,886 B2* | 9/2012 | Bisiaux | G01N 29/4445 |
| | | | 73/644 |
| 8,806,944 B2* | 8/2014 | Grubb | G01N 29/223 |
| | | | 73/602 |
| 10,962,359 B2* | 3/2021 | Clossen-von Lanken Schulz | |
| | | | G01B 17/02 |
| 11,353,430 B2* | 6/2022 | Bruch | G01N 29/24 |
| 2008/0236287 A1 | 10/2008 | Van Agthoven et al. | |
| 2011/0126626 A1* | 6/2011 | Koch | G01N 29/28 |
| | | | 73/632 |
| 2014/0076053 A1 | 3/2014 | Gaudet et al. | |
| 2018/0172641 A1 | 6/2018 | Huang et al. | |
| 2018/0299412 A1 | 10/2018 | Mendes Rodrigues | |
| 2020/0249205 A1 | 8/2020 | Kimura et al. | |

FOREIGN PATENT DOCUMENTS

| | | | | |
|---|---|---|---|---|
| EP | 3470775 A1 * | 4/2019 | | G01B 17/02 |
| JP | 57147053 | 9/1982 | | |
| JP | 2005181140 | 7/2005 | | |
| JP | 6258301 | 1/2018 | | |

* cited by examiner

ULTRASONIC TESTING USING A PHASED ARRAY

TECHNICAL FIELD

This related to ultrasonic non-destructive testing, and in particular using a phased array to obtain a wall thickness profile along a scan line.

BACKGROUND

Corrosion and wall thickness loss, such as at pipe supports, is a concern across many industries. Problems typically occur at the bottom of the pipe where a small corrosion cell is created at the support point. This can also occur around the sides and top of the pipe where it may be restrained by clamps or U-bolts. In either case, direct hands-on access to the corrosion surface may be restricted, which limits the inspection options. Lifting the pipe or implementing secondary support to examine the areas of concern are typically avoided as the severity of the corrosion is unknown and the activity may increase the risk of failure.

Following visual inspection to identify target areas, inspection is often performed with radiographic (RT) or ultrasonic (UT) techniques. Quantification of corrosion may be difficult with RT as the corrosion measurement is based on film density, which can vary significantly with slight variations in exposure angles and interference from the pipe support. Ultrasonic tools using electro-magnetic acoustic transducers (EMAT) and guided waves have been used, but the implementation and signal characterizing differs traditional UT. Most UT technicians still rely on understanding of conventional ultrasonic pulse-echo or pitch-catch techniques.

Many conventional UT techniques have been researched and implemented into testing programs over the past 20 years for inspection of corrosion at pipe supports. In the late 1990's, Shell developed the Pipe Support Tool, which used shear waves traveling around the pipe circumference in a pitch-catch configuration. In a pulse-echo configuration, the effect of reflection from radial drilled holes to simulate pitting corrosion has also been studied. Conventional approaches such as CHIME®, used mainly for screening and categorization, and M-Skip®, which can be used for detection and sizing of some locations are also used.

SUMMARY

According to an aspect, there is provided a method of testing for thickness loss in a metal wall having a nominal thickness, the method comprising the steps of: mounting a first ultrasonic transducer and a second ultrasonic transducer to the metal wall such that the first ultrasonic transducer and second ultrasonic transducer are in ultrasonic communication along a beam line; moving the first ultrasonic transducer and the second ultrasonic transducer along a scan line; obtaining a series of composites of received signal measurements by, at multiple locations along the scan line, using the first ultrasonic transducer, transmitting a plurality of ultrasonic signals through the metal wall along the beam line at a plurality of transmission angles, and obtaining a composite of received signal measurements by combining signal amplitudes of the plurality of ultrasonic signals measured by the second ultrasonic transducer; and inputting the series of composites into a predetermined relationship to obtain a thickness profile that is indicative of a proportion of remaining wall thickness along the scan line, the predetermined relationship being experimentally obtained to characterize a given metal wall of nominal thickness.

According to other aspects, the method may further comprise one or more of the following aspects, alone or in combination: the method may further comprise the step of conditioning the series of composites prior to inputting the series of composites into the predetermined relationship; the thickness profile may be a normalized thickness profile obtained by normalizing the series of composites, normalizing a result of the predetermined relationship, or combinations thereof; a composite of received signal amplitudes may be obtained by summing maximum signal amplitudes; the metal wall may be the wall of a pipe, and the metal wall may be adjacent to an obstruction; the scan line may be in an axial direction or a circumferential direction relative to the curvature of the examination surface; the method may further comprise the steps of using the first ultrasonic transducer, transmitting an ultrasonic pulse along the beam line and detecting a reflection of the ultrasonic pulse at the first ultrasonic transducer to determine a location of a first edge of thickness loss, and using the second ultrasonic transducer, transmitting an ultrasonic pulse along the beam line and detecting a reflection of the ultrasonic pulse at the second ultrasonic transducer to determine a second edge of thickness loss; the predetermined relationship is a formula of the form $t = a \cdot \log_n(x+b_1) + b_2$, where t is the thickness profile, a is a coefficient related to the metal wall, x is the series of composites of received signal measurements, $b_1$ and $b_2$ are adjustment factors, and n is the logarithmic base; the beam line may be perpendicular to the scan line.

According to another aspect, there is provided a method of characterizing a metal wall having a known thickness profile to determine a relationship between thickness and composites of received signal measurements, the method comprising the steps of: mounting a first ultrasonic transducer and a second ultrasonic transducer to the metal wall such that the first ultrasonic transducer and second ultrasonic transducer are in ultrasonic communication along a beam line; moving the first ultrasonic transducer and the second ultrasonic transducer along a scan line that traverses the known thickness profile; obtaining a series of composites of received signal measurements by, at multiple locations along the scan line: using the first ultrasonic transducer, transmitting a plurality of ultrasonic signals through the metal wall along the beam line at a plurality of transmission angles, and obtaining a composite of received signal measurements by combining signal amplitudes of the plurality of ultrasonic signals measured by the second ultrasonic transducer; and using the known thickness profile in combination with the series of composites, determining the relationship between thickness and composites of received signal measurements.

According to other aspects, the method may further comprise one or more of the following aspects, alone or in combination the series of composites may be conditioned prior to determining the relationship; the thickness profile may be a normalized thickness profile; a composite of received signal amplitudes may be obtained by summing maximum signal amplitudes; the relationship may be a formula of the form $t = a \cdot \log_n(x+b_1) + b_2$, where t is the known thickness profile, a is a coefficient related to the metal wall, x is the series of composites of received signal measurements, $b_1$ and $b_2$ are adjustment factors, and n is the base of the log, and wherein a, $b_1$, and $b_2$ may be determined based on the known thickness profile and the series of composites of received signal amplitudes.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
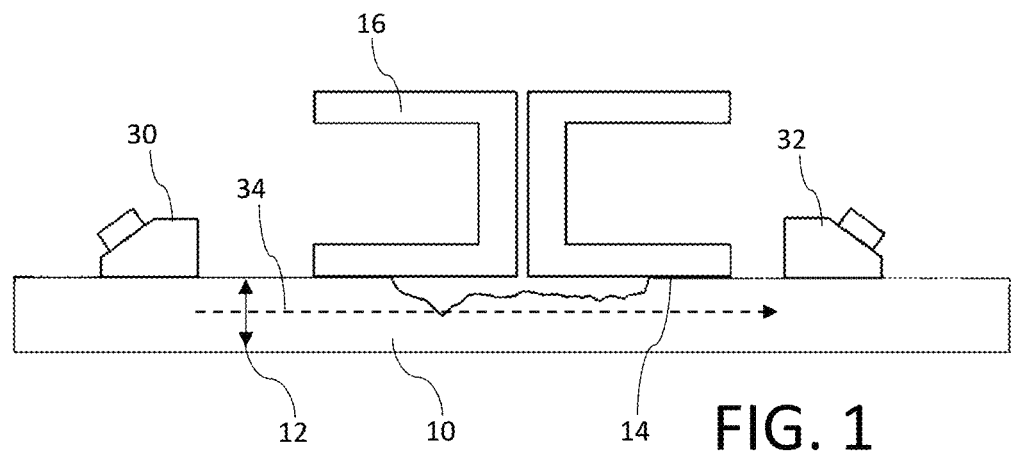
FIG. 1 is a side elevation view in section of a metal wall with thickness loss, and ultrasonic transducers mounted to the wall.
Figure 2:
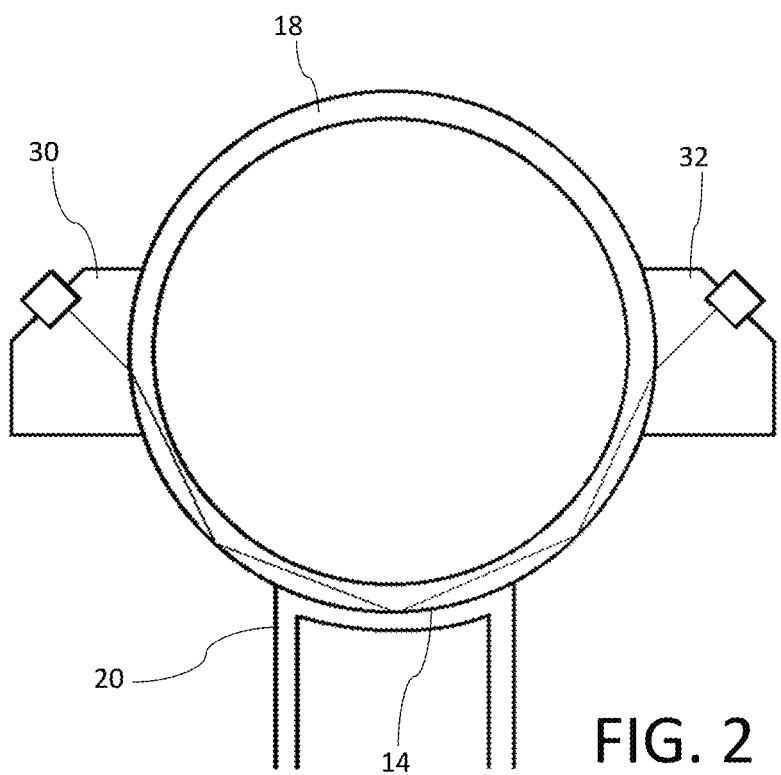
FIG. 2 is an end elevation view in section of a metal pipe with ultrasonic transducers mounted to it.

A method of testing for thickness loss in a metal wall 10 having a nominal thickness 12 will now be described with reference to FIG. 1 through 7. The method may be used to detect wall thickness in metal walls generally, and may be particularly useful to test an inaccessible area 14 of metal walls 10, or any metal wall 10. Two examples of metal walls 10 with inaccessible surface areas 14 are shown in FIG. 1 and FIG. 2. FIG. 1 depicts a planar metal wall 10 that is adjacent to a beam 16 and FIG. 2 depicts a metal wall 10 that is a wall of a pipe 18 carried by a pipe shoe 20. Structures such as pipe shoe 20 may obstruct a direct view of the area to that results in an inaccessible surface area 14. It will be understood the method described below may be used to test for thickness loss in a metal wall 10 in other configurations as well. As used herein, a metal wall is used to refer to a sheet of metal such as is shown in FIG. 1, the wall of a metal pipe such as is shown in FIG. 2, or other similar type of structure that has a generally consistent thickness in an area to be tested.

Referring to FIG. 1, a first ultrasonic transducer 30 and a second ultrasonic transducer 32 are mounted to metal plate 10 such that they are in ultrasonic communication along a beam line 34 between first and second transducers 30 and 32. Beam line 34 is understood to include a line along metal wall 10 to which transducers 30 and 32 are mounted and that transducers 30 and 32 transmit ultrasonic signals along. Beam line 34 travels in a plane that traverses the thickness of metal wall 10 (i.e. orthogonal to metal plate 10) through which ultrasonic energy is transmitted, and may be distinguished from a surface wave that travels along the surface of metal plate 10. First and second ultrasonic transducers 30 and 32 may be configured in a transmit/receive pair, where one transmits and the other receives ultrasonic signals, or they may be configured to both transmit and receive. In the examples described herein, first ultrasonic transducer 30 and second ultrasonic transducer 32 will be described as transmitting and receiving, respectively.

The method of transmitting and receiving ultrasonic signals is well known in the art. One example is described herein in general terms, however it will be understood that modifications may be used in order to obtain the series of composite numbers as described below.

Figure 5:
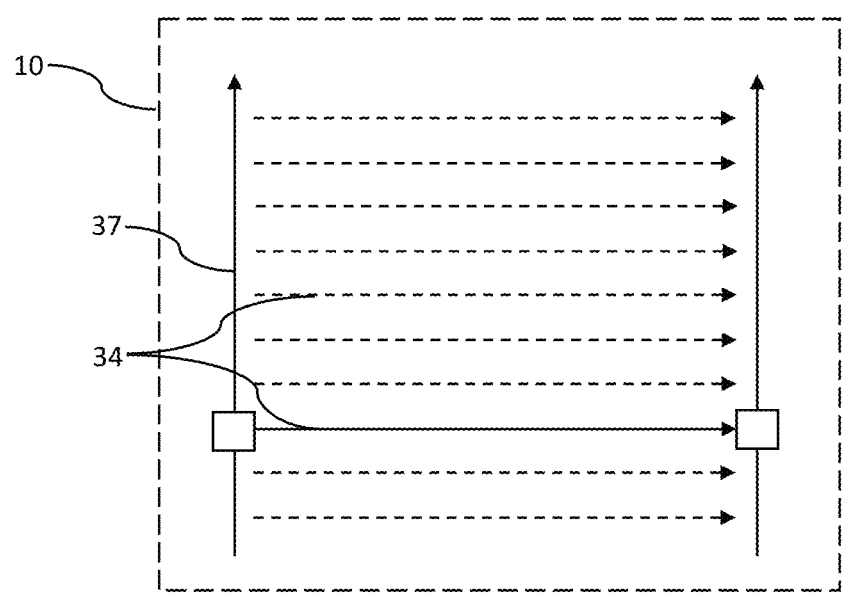
FIG. 5 is a top plan view showing a scanning approach of beam lines and scan lines.

After being mounted, referring to FIG. 5, ultrasonic transducers 30 and 32 are moved along a scan line 37 across the surface of metal wall 10. At multiple locations along scan line 37, ultrasonic transducers 30 and 32 transmit and receive ultrasonic signals, as will be discussed below, to obtain a thickness profile of metal wall 10 along scan line 37. The measured thickness profile is indicative of a proportion of remaining wall thickness at various points along scan line 37. Typically, scan line 37 will be straight, such as along the axis of a pipe 18, and substantially perpendicular to beam line 34, however scan line 37 may follow any path defined by the user, depending on the portion of metal wall 10 that the user wishes to test, and may not be perpendicular to beam line 34. Multiple beam lines 34 are designated along scan line 37 to obtain a series of readings, which are then used to calculate a thickness profile.

First ultrasonic transducer 30 may be configured to transmit ultrasonic signals along beam line 34 toward second ultrasonic transducer 32. Typically, beam line 34 will be perpendicular to scan line 37, although this is not required. Preferably, the spacing between first and second transducers 30 and 32 along beam line 34 will be substantially the same as they move along scan line 37. First ultrasonic transducer 30, or the transmitting transducers, is preferably a phased array that couples ultrasonic signals into metal wall 10 at a range of angles. The range of angles transmitted by first ultrasonic transmitter 30 will generally be a discrete number of different angles. The interval between angles may vary, depending on the design of transducer 30 and the preferences of the user, but are preferably close enough to provide a sufficient resolution during testing.

Figure 3:
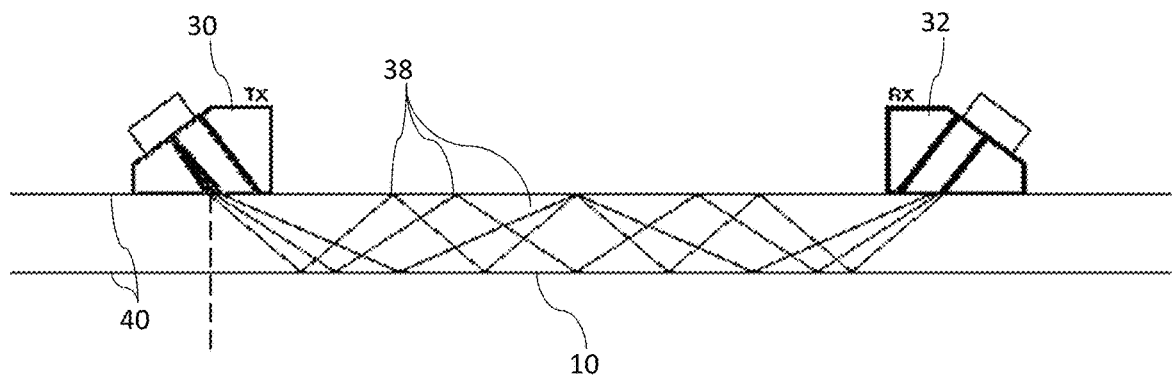
FIG. 3 is a side elevation view in section of a metal wall showing signal paths with the metal wall.
Figure 4:
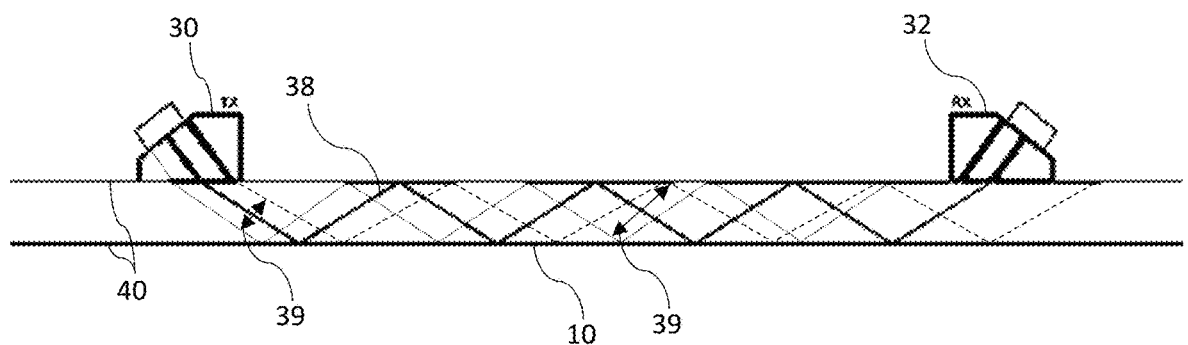
FIG. 4 is a side elevation view in section of a metal wall showing dispersion of a signal within the metal wall.

Referring to FIG. 3, several examples of beam paths 38 at different angles are illustrated, with the ultrasonic signal reflecting off boundaries 40 of metal wall 10 before arriving at second ultrasonic transducer 32. While the beam paths 38 illustrated in FIG. 3 are shown to terminate at second transducer 32, it is understood that some angles will not arrive at the second ultrasonic transducer 32, or due to dispersal, a portion of which will be received but at a lower strength than the center of the beam. In general, measurements are preferably taken at the maximum of the beam. This dispersion is depicted in FIG. 4, which illustrates the difference between the beam path 38 and a width of the beam 39. The received signal 50 may be recorded as a plurality of maximums 52 of signal amplitudes as shown, with each maximum 52 corresponding to a specific number of reflections the signal undergoes before passing second transducer 32.

It will be understood that, using a phased array, the spacing between transducers 30 and 32 is less important relative to a mono-element transducer, which requires an appropriate spacing between transducers to ensure an optimized amount of the ultrasonic signal arrives at the receiver. In particular, at any combination of inspection angle and plate thickness there is only one probe spacing corresponding to a skip number for optimal transmission of sound between the transducers when using a mono-element transducer. This may be visualized with reference to FIG. 4, if transducer 30 were replaced with a mono-element transducer to achieve the depicted signal path. In contrast, a phased array with an angular sectorial sweep provides a multitude of suitable angles for any reasonable probe spacing. FIG. 3 illustrates a similar example of three optimal angles at one probe spacing using a phased array sectorial sweep, forming the 4-skip "WW", 3-skip "WV" and 2-skip "W" paths. Note that the even numbered skips interrogate the OD surface where the corrosion is expected.

Figure 6:
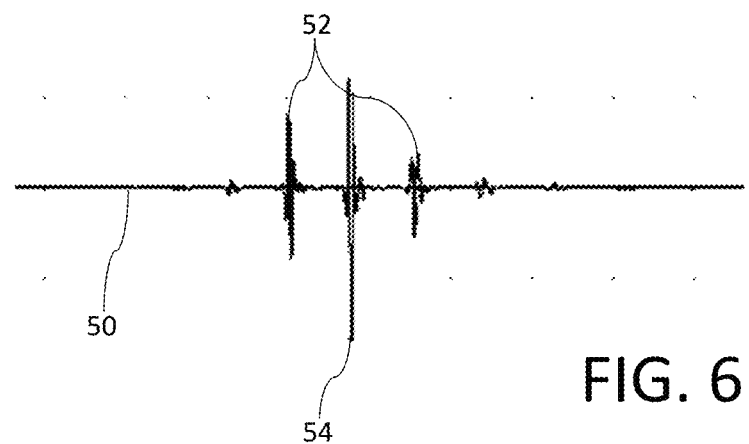
FIG. 6 is a plot of a received signal.
Figure 7:
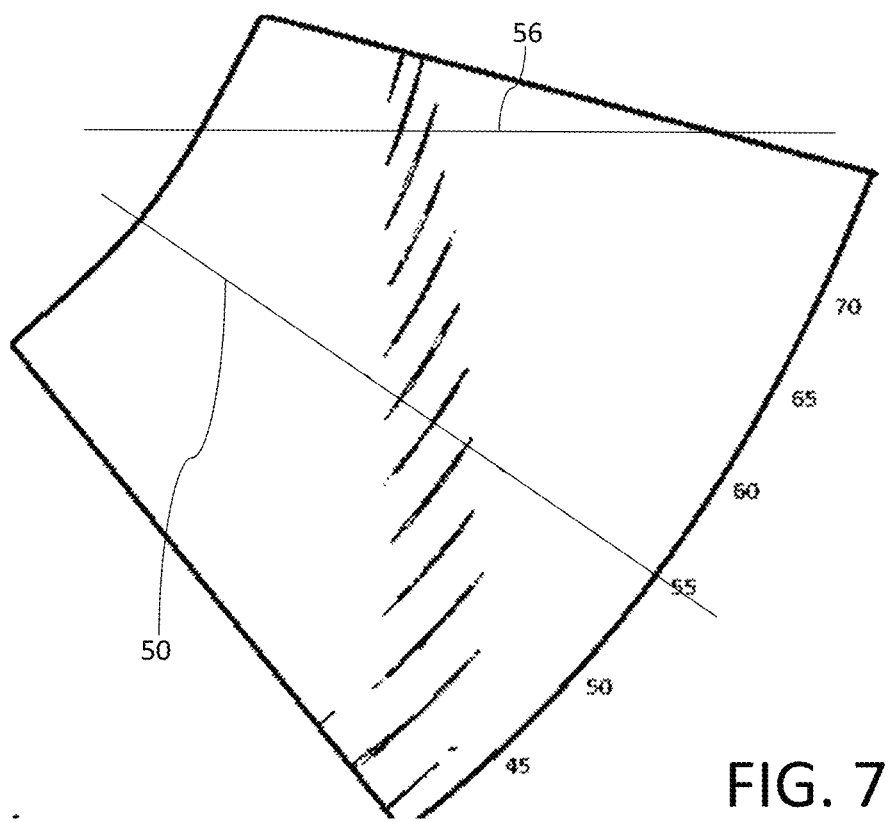
FIG. 7 is a plot of received signals plotted vs the transmission angle.

Referring to FIG. 6, for an ultrasonic signal transmitted at a given angle, second ultrasonic transducer 32 measures a received signal 50, depicted as a signal amplitude plotted as a function of time. As the speed of sound in metal wall 10 is known, the time at which an amplitude measurement is recorded corresponds to a total distance the signal has travelled within metal wall 10. For most received signals 50, there will be one central maximum 54 that corresponds to the peak amplitude of received signal 50. FIG. 7 depicts the received signals 50 as a function of the transmission angle, where the center of each signal corresponds to the central maximum as received, and signal strength is reduced away from the maximum. As can be seen, there is some overlap in signals, separated in time. FIG. 6 depicts signals received by second ultrasonic transducer 32 with pulses separated in time around a maximum signal strength.

At each of the multiple locations along scan line 37, first ultrasonic transducer 30 transmits a plurality of ultrasonic signals along beam line 38 at a plurality of transmission angles. For each transmitted signal, a received signal 50 is measured by second ultrasonic transducer 32. A composite of received signal measurements is obtained by combining signal amplitudes of the plurality of received signals 50, typically at the maximum of each signal, but in any event, consistently across all measurements. Combining signal amplitudes of the received signals 50 may include various methods of manipulating the data of received signals 50. In one example, the magnitude of the central maximum 54 of each received signal 50 may be obtained and all the magnitudes summed to obtain the composite of received signal measurements for a location along scan line 37. This may involve analysing amplitude data of multiple received signals 50 to identify the maximum amplitudes based on the angle of the signal or the along a constant depth of the signal 56, the availability of which may depend on the test equipment being used. The maximum amplitudes of the data seta may then be combined to obtain a composite of received signal measurements. FIG. 7 is an example in which the maximum amplitude is can be determined based on the angle of signal 50 or signal projected along a constant depth 56. Other approaches may also be used to obtain a composite for a given beam line.

The above steps are repeated along multiple beam lines 38, spaced at multiple locations along the scan line 37. At each location, a composite of received signal amplitudes based on the series of transmission angles is obtained. These are then included in an array or series of composites, representing the detected signals along each beam line 38 of received signal measurements.

The series of composites may then be input into a predetermined relationship to obtain a thickness profile that is indicative of a proportion of remaining wall thickness at each point along scan line 37. The results may be used to estimate a proportion of wall thickness along scan line 37. In particular, where the thickness of the wall is reduced, the composite of received signal amplitudes will differ from what would be expected for a metal wall of nominal thickness. In general, this will be a normalized value that is obtained at a point where there is no wall thickness reduction, and the other calculated values are compared to this.

The predetermined relationship may be defined such that the composite of received signal amplitudes at that location to a thickness value are is indicative of the proportion of remaining wall thickness at that location. The predetermined relationship may be experimentally obtained to characterize a given metal wall of nominal thickness, where the nominal thickness may be an expected thickness of the metal wall, such as a thickness provided by a manufacturer, or a measured thickness of metal wall 10. In one example, the predetermined relationship may be determined by performing calibration tests using known materials with known thickness profiles. The predetermined relationship may differ primarily based on material thickness, however the predetermined relationship may also take into account other factors, such as the type of material. These other factors may be determined based on routine experimentation.

In one example, a sample was scanned to obtain a series of composites from a plate with a known thickness profile formed by machining out patches. The series of composites were then processed in an algorithm, and coefficients were determined that resulted in a relatively accurate estimate of the remaining thickness. It was found that a natural logarithmic expression with experimentally-determined coefficients gave acceptable results.

The series of composites of received signal amplitudes may be conditioned prior to being input into the predetermined relationship to obtain the thickness profile. Conditioning may include normalizing the series or otherwise scaling, adding or subtracting from the series, or other manipulations to the numbers in the series as a whole or individually, such that they may be input into the predetermined relationship. While conditioning of the series of composites of received signal amplitudes may be described as a separate step from inputting the conditioned series into the predetermined relationship, the conditioning that is applied to the series may be included as part of the predetermined relationship. In this manner, conditioning of the series may be considered a sub step of inputting the series into the predetermined relationship, or a step independent of input into the predetermined relationship.

The thickness profile that is indicative of a proportion of remaining wall thickness may be a normalized thickness profile in which the calculated amounts are an estimated fraction of thickness remaining at each point. Such a normalized thickness profile may be obtained by applying a normalizing condition to the series of composites, normalizing a result of the predetermined relationship, or combinations thereof.

The predetermined relationship may be a mathematical formula with the series of composites of received signal amplitudes being input into the formula, and the output is the thickness profile that is indicative of a proportion of remaining wall thickness. Typically, greater input variables will correlate to higher output values. Depending on the mathematical formula, the formula may only be valid over a finite range of input values, and as such, the input values may need to be conditioned such that they fall within the finite range. In one example, a predetermined relationship may require a normalized input, where the series of composites are conditioned to have values between 0 and 1.

The mathematical formula may take a variety of forms. In one example, beneficial results were obtained using the relationship $t = a \cdot \log_n(x+b_1)+b_2$, where t is a calculated value indicative of a proportion of remaining wall thickness, a is a coefficient related to the metal wall, x is the series of composites of received signal measurements, $b_1$ and $b_2$ are adjustment factors related to the metal wall, and n is the base of the log. The coefficients a, $b_1$, and $b_2$ may be experimentally derived such that, when applied to the series of composites, the results relate to the remaining wall thickness. In one example, the above formula may be of the form $t_{norm} = a \cdot \ln(x_{norm})+1$, with $b_1=0$, $b_2=1$, and n=e, where $x_{norm}$ is a normalized series of composites, $t_{norm}$ is a fraction of thickness remaining, and a is an experimentally obtained coefficient that characterizes a given wall thickness. a may depend on the thickness of metal wall 10, the material metal wall 10 is made of, or other properties of metal wall 10. As noted above, the results may be normalized to 1 so that the end values are a direct estimation of the proportion of wall thickness remaining. This may be done by normalizing the series of composites to the largest value in the series prior to inputting into a logarithmic equation. The values may also be normalized after applying the formula to the series of composites. The values may also be converted to a different scale. For example, if the results are converted to a scale based on 100 rather than 1, the results may be read as a percentage, rather than a fraction of wall thickness remaining.

In addition to a logarithmic function, the predetermined relationship may include any number of different functions well known in the art, alone or in combination. This may include exponential functions (i.e. $n^x$, where n is a real number), power functions (i.e. $x^n$, where n is a real number), trigonometric functions (i.e. $\sin(x)$, $\sin^{-1}(x)$), hyperbolic functions (i.e. $\sin h(x)$, $\sin h^{-1}(x)$), or other algebraic and transcendental functions. The predetermined relationship may be constructed from any number of mathematical functions, combined linearly or non-linearly, with any number of factors, terms, or coefficients, which may be inherent to the relationship, or experimentally obtained to characterize a given metal wall 10. The combination of functions may describe a single curve or a combination of piecewise elements that form a single function. The predetermined relationship may require a normalized series of composites, or composites that fall within a specific range, to provide suitable results.

As will be understood, first ultrasonic transducer 30 and second ultrasonic transducer 32 may be used to perform other tests on metal wall 10 that are well known in the art. These tests may include using first ultrasonic transducer 30 to transmit an ultrasonic pulse along beam line 38 and detect a reflection of the pulse at the first ultrasonic transducer to determine a location of a first edge of a thickness loss and using second ultrasonic transducer 32 to transmit an ultrasonic pulse along beam line 38 and detect a reflection of the pulse at second ultrasonic transducer 32 to determine a location of a second edge of a thickness loss.

A method of determining a relationship as described above will now be described. The method steps are similar to those described above, however the first and second ultrasonic transducers 30 and 32 are mounted to a metal wall 10 with a known thickness, and a known thickness profile. Transducers 32 are moved along a scan line 37 that traverses the known thickness profile. At multiple locations along scan line 37, first ultrasonic transducer 30 transmits a plurality of ultrasonic signals along beam line 38 as described above, and second ultrasonic transducer 32 measures received signals 50. Signal amplitudes of the received signals are combined to obtain a composite of received signal amplitudes for each location, as described above.

The obtained series of composites of received signal amplitudes and the known thickness profile are used to determine the relationship between thickness and composites of received signal measurements. Typically, this is done by fitting a mathematical formula to the obtained series and known thickness, which results in one or more coefficients or adjustment factors that can be used for a metal wall of a similar thickness and material to the one for which the relationship was determined. Determining the relationship may also include determining a mathematical formula to use, and then fitting the chosen formula.

A relationship determined according to the above steps may be used as a predetermined relationship for a specific metal wall 10 with a given thickness and material.

Experimental Results

Figure 8:
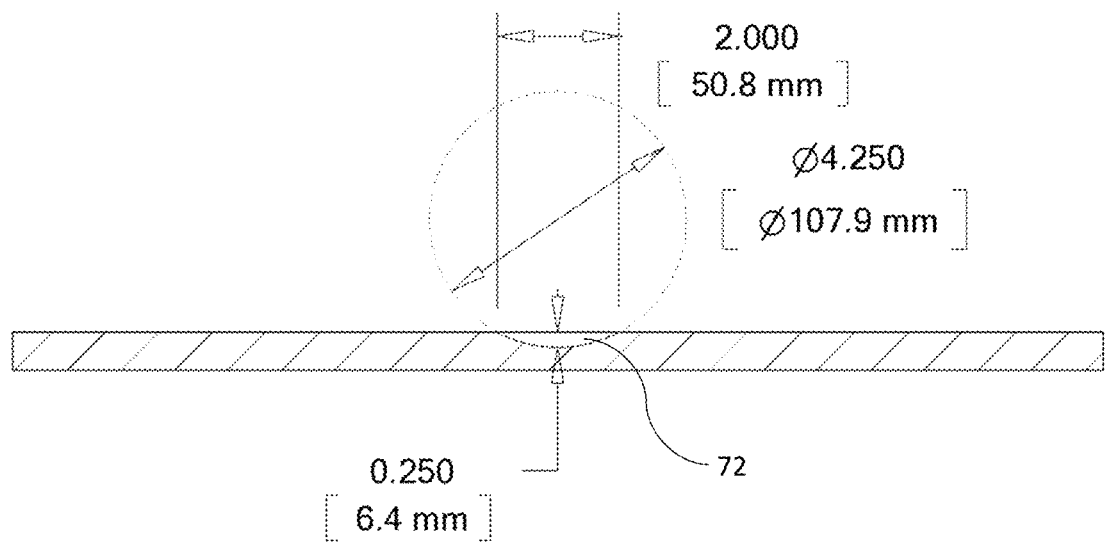
FIG. 8 is a side elevation view in section of a machined patch in a wall used in testing the testing method.
Figure 9:
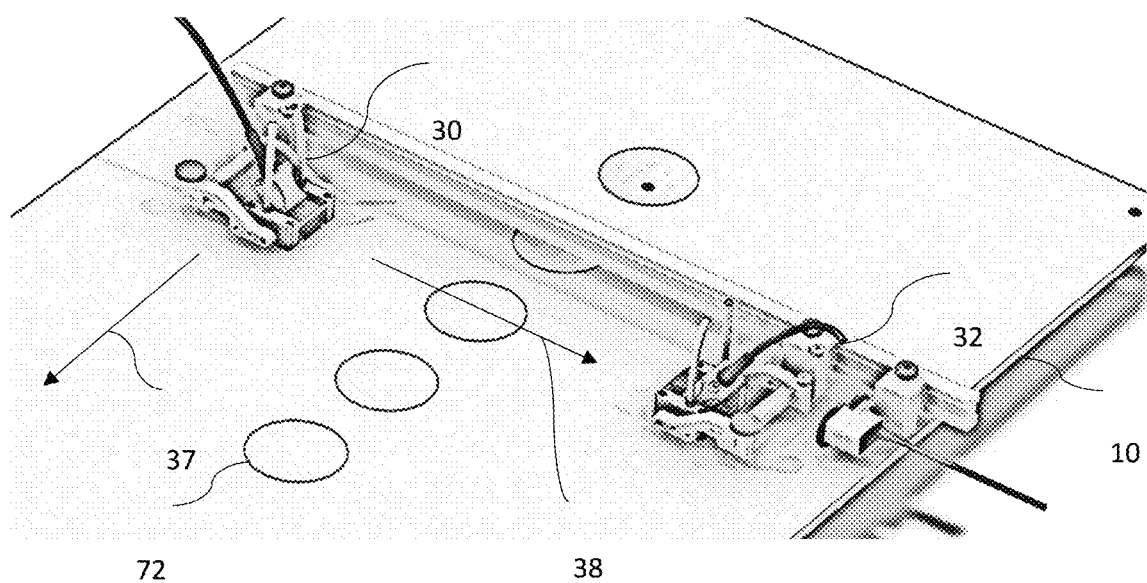
FIG. 9 is a perspective view of the experimental setup.

The results of a test will now be discussed in which an example of the process described above was applied to plates of a known thickness and with machined thickness defects in the surface. In particular, plates with dimensions of 18×24 inch (457×610 mm) with thicknesses of ¼ inch (6.4 mm), ⅜ inch (9.5 mm) and ⅝ inch (15.9 mm) were prepared with simulated wall loss patches of 20, 40, 60, 80 and 100%. Each patch was defined by subtraction of an idealized spherical pattern with diameter and depth varying in respect to plate thickness and target wall loss. An example of a machined patch 72 is shown in FIG. 8, simulating a machined corrosion profile of 40% loss in a ⅝ in. plate. The test equipment, including transducers 30 and 32, were arranged on plate 10 as shown in FIG. 9. Ultrasonic test equipment used was a Sonatest Veo+32:128, two Olympus 5L16-A10 transducers mated to 55° wedges, a water pump for couplant delivery, and a Jireh ODI-II scanner.

Multiple tests were performed to examine amplitude signal responses in different scenarios. Transducer probes 30 and 32 were set up in a pitch-catch arrangement using an unfocused sectorial group from 40° to 75° in 1° angular steps. Data was recorded in the unrectified format at 1 mm increments using 125 MHz sampling frequency and sub-sampling set at 1:4. Probe center spacing (PCS) was varied from 150 mm to 350 mm in 50 mm increments, with the spacing measured between the wedge front faces. Data acquisition was performed over the 5 simulated corrosion patches and 3 plate thicknesses.

Figure 10A:
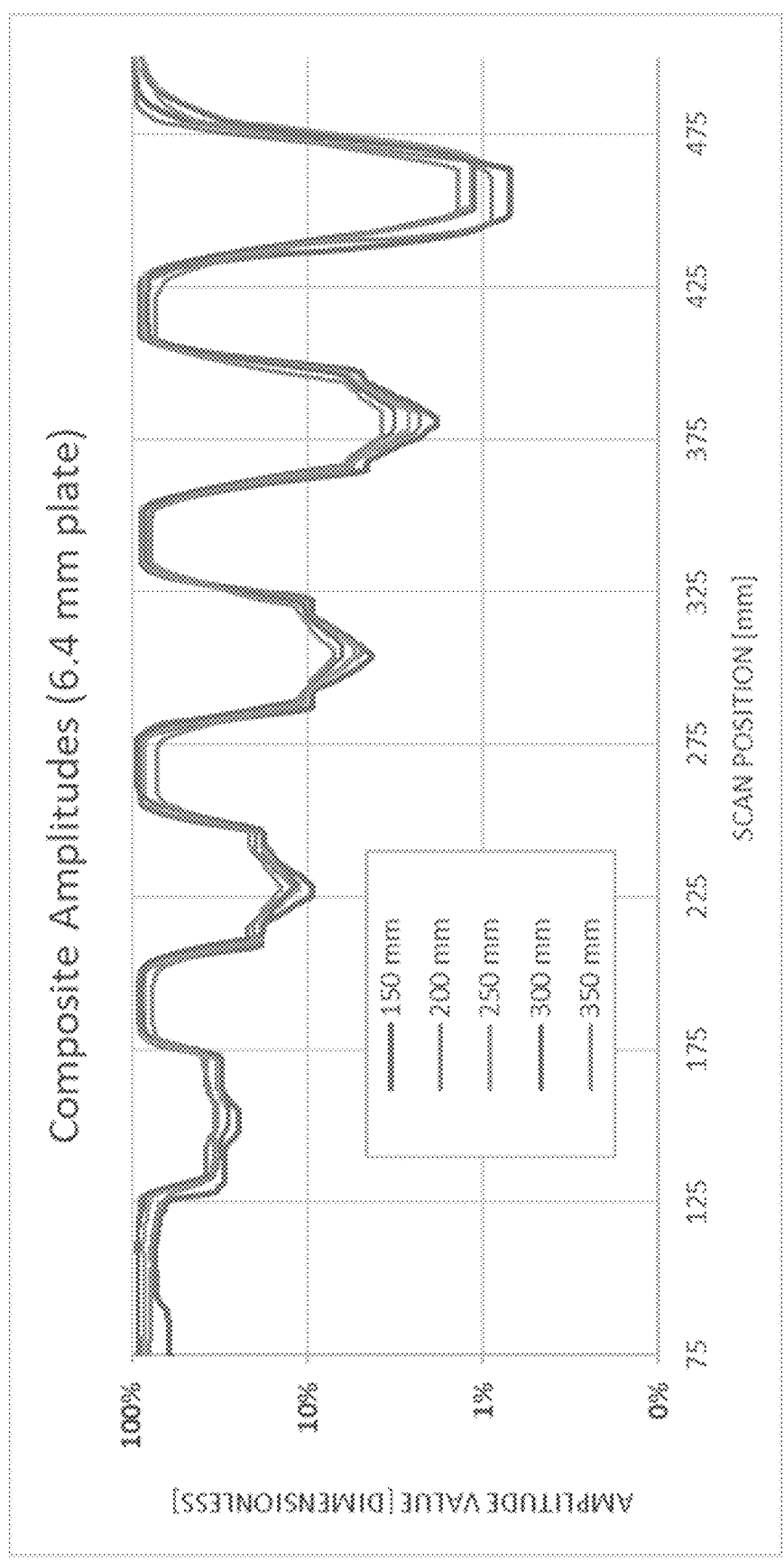
FIG. 10a, 10b, 10c are plots of calculated remaining wall thicknesses for different probe spacings and wall thicknesses.
Figure 10B:
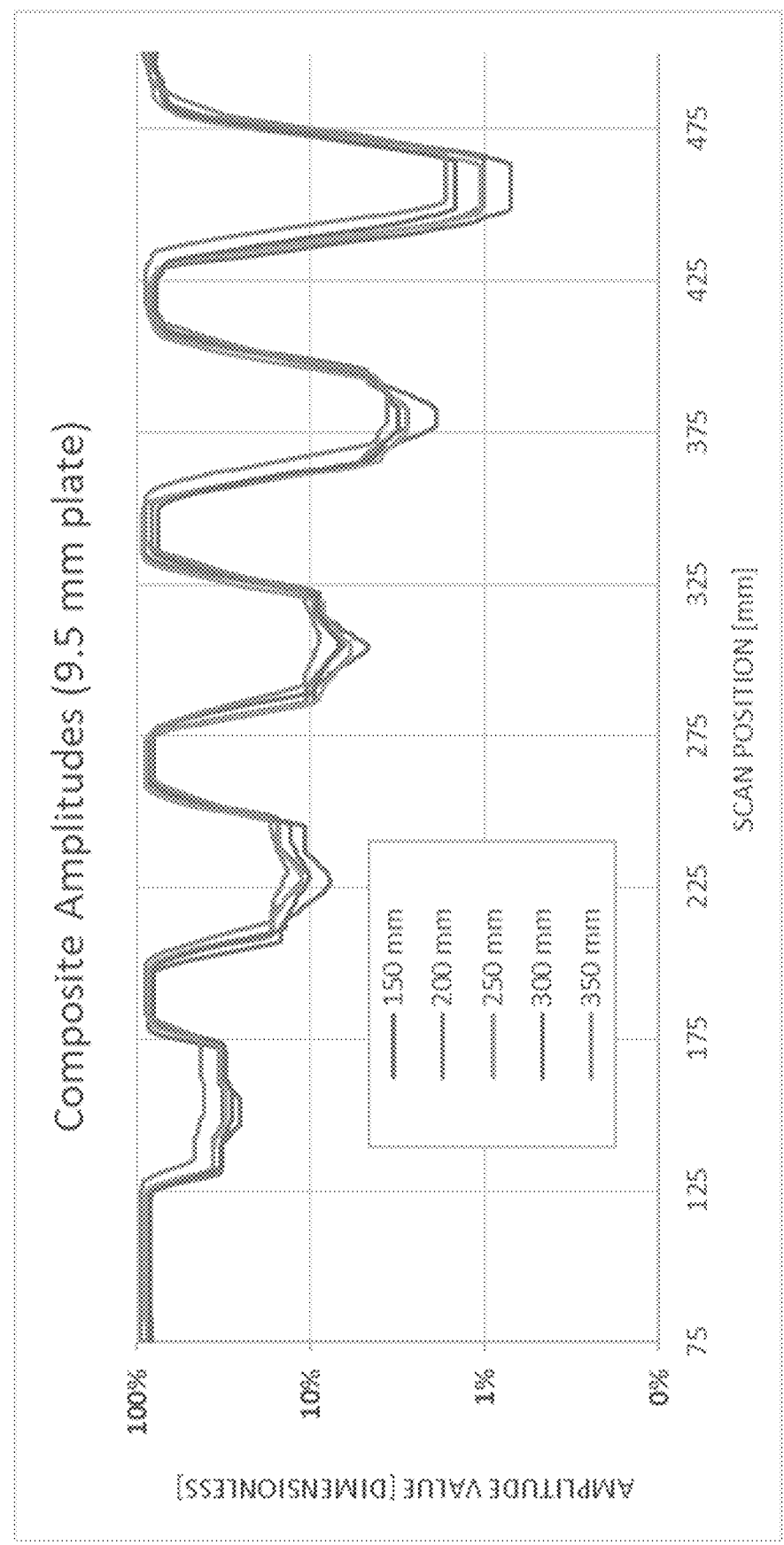
Figure 10C:
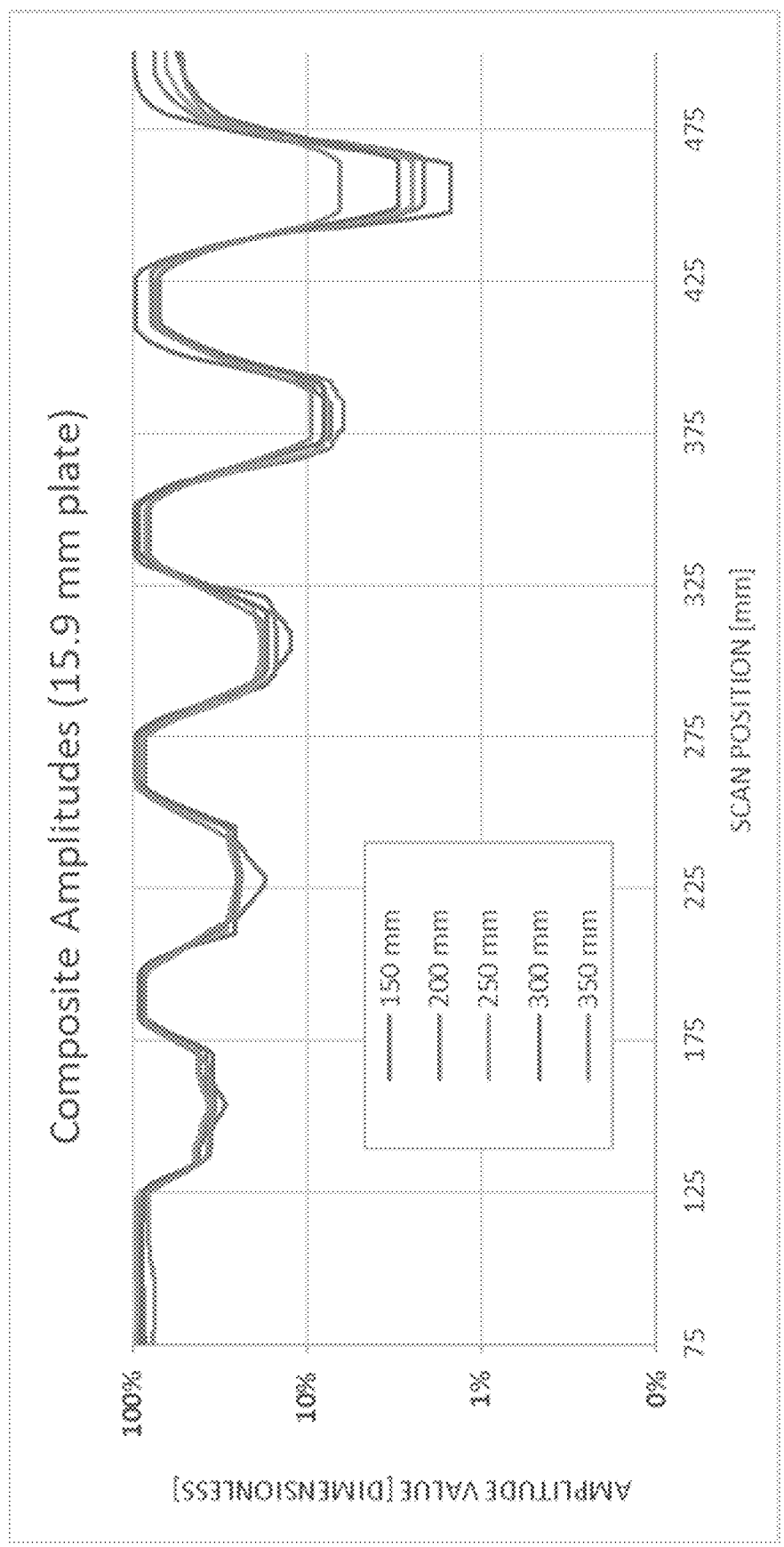

During analysis, data was analyzed using S-scan, B-scan, Top View, End View, and A-scan views using the Sonatest platform to obtain high-quality measurements. Wall loss detection and profile measurements were performed using signal attenuation. The composites obtained for each scan were processed using a natural logarithmic equation with suitable coefficients, and the resulting numbers were compiled and plotted for each PCS. The effect of the 5 corrosion patches (left to right, 20% to 100%) on signal amplitude is shown for each plate thickness in FIGS. 10a-10c. The Y-axis is plotted on a logarithmic scale revealing attenuation which steadily increases with wall loss.

As can be seen, the results form using a phased array as discussed herein provide a reasonable estimate of the remaining wall thickness at each patch. These results are relatively consistent and may be obtained for various probe spacings and wall thicknesses. In addition, using a phased array allows a user to extract data from multiple angles for optimal time-of-flight signal analysis, and the composite angle attenuation is more predictable than an analysis based on individual angles.

Figure 11:
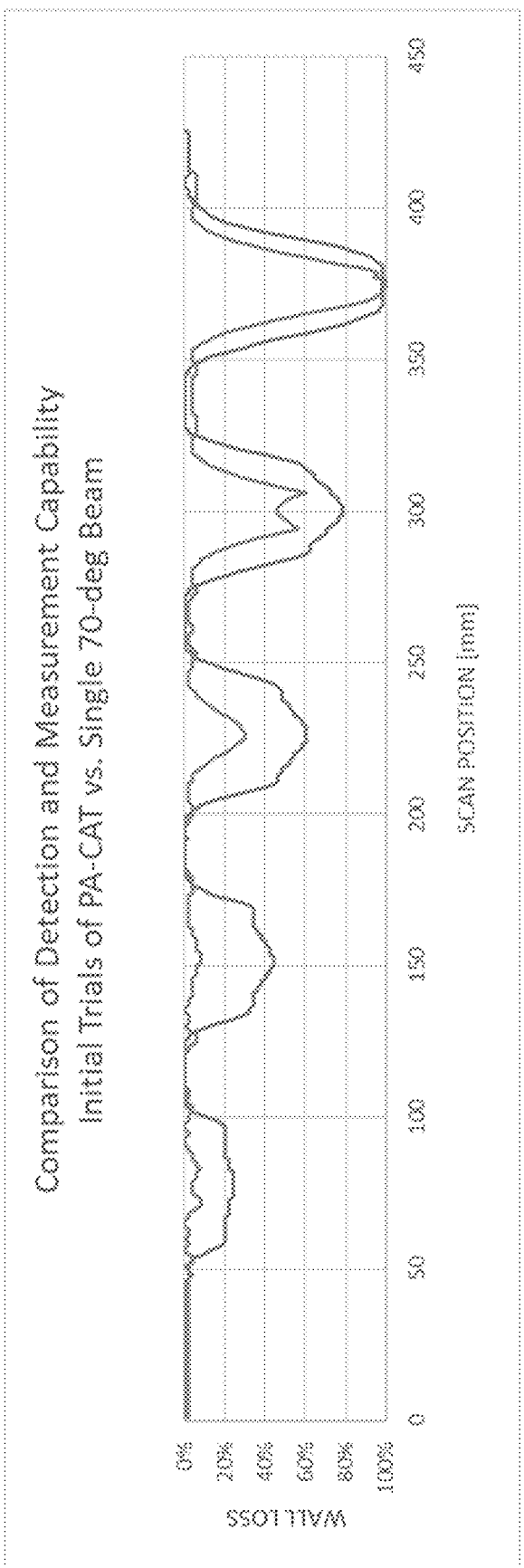
FIG. 11 is a plot comparing the results from the testing method discussed herein and the results using a single angle.

By way of comparison, FIG. 11 represents the potential accuracy of the technique discussed herein as compared to a mono-element that transmits an ultrasonic signal at a single angle.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of testing for thickness loss in a metal wall having a nominal thickness, the method comprising the steps of:
   mounting a first ultrasonic transducer and a second ultrasonic transducer to the metal wall such that the first ultrasonic transducer and second ultrasonic transducer are in ultrasonic communication along a beam line;
   moving the first ultrasonic transducer and the second ultrasonic transducer along a scan line;
   obtaining a series of composites of received signal measurements by, at multiple locations along the scan line:
      using the first ultrasonic transducer, transmitting a plurality of ultrasonic signals through the metal wall along the beam line at a plurality of transmission angles; and
      obtaining a composite of received signal measurements by combining signal amplitudes of the plurality of ultrasonic signals measured by the second ultrasonic transducer; and
   inputting the series of composites into a predetermined relationship to obtain a thickness profile that is indicative of a proportion of remaining wall thickness along the scan line, the predetermined relationship being experimentally obtained to characterize a given metal wall of nominal thickness.

2. The method of claim 1, further comprising the step of conditioning the series of composites prior to inputting the series of composites into the predetermined relationship.

3. The method of claim 1, wherein the thickness profile is a normalized thickness profile obtained by normalizing the series of composites, normalizing a result of the predetermined relationship, or combinations thereof.

4. The method of claim 1, wherein the step of obtaining a composite of received signal amplitudes comprises summing maximum signal amplitudes.

5. The method of claim 1, wherein the metal wall is the wall of a pipe, and the metal wall is adjacent to an obstruction.

6. The method of claim 5, wherein the scan line is in an axial direction relative to the pipe or the scan line is in an angular direction relative to the pipe.

7. The method of claim 1, further comprising the steps of:
   using the first ultrasonic transducer, transmitting an ultrasonic pulse along the beam line and detecting a reflection of the ultrasonic pulse at the first ultrasonic transducer to determine a location of a first edge of thickness loss; and
   using the second ultrasonic transducer, transmitting an ultrasonic pulse along the beam line and detecting a reflection of the ultrasonic pulse at the second ultrasonic transducer to determine a second edge of thickness loss.

8. The method of claim 1, wherein the predetermined relationship is a formula of the form $t = a \cdot \log_n(x + b_1) + b_2$, where:
   t is the thickness profile;
   a is a coefficient related to the metal wall;
   x is the series of composites of received signal measurements;
   $b_1$ and $b_2$ are adjustment factors; and
   n is the logarithmic base.

9. The method of claim 1, wherein the beam line is perpendicular to the scan line.

10. A method of characterizing a metal wall having a known thickness profile to determine a relationship between thickness and composites of received signal measurements, the method comprising the steps of:
    mounting a first ultrasonic transducer and a second ultrasonic transducer to the metal wall such that the first ultrasonic transducer and second ultrasonic transducer are in ultrasonic communication along a beam line;
    moving the first ultrasonic transducer and the second ultrasonic transducer along a scan line that traverses the known thickness profile;
    obtaining a series of composites of received signal measurements by, at multiple locations along the scan line:
       using the first ultrasonic transducer, transmitting a plurality of ultrasonic signals through the metal wall along the beam line at a plurality of transmission angles; and
       obtaining a composite of received signal measurements by combining signal amplitudes of the plurality of ultrasonic signals measured by the second ultrasonic transducer; and
    using the known thickness profile in combination with the series of composites, determining the relationship between thickness and composites of received signal measurements.

11. The method of claim 10, further comprising the step of conditioning the series of composites prior to determining the relationship.

12. The method of claim 10, wherein the thickness profile is a normalized thickness profile.

13. The method of claim 10, wherein the step of obtaining a composite of received signal amplitudes comprises summing maximum signal amplitudes.

14. The method of claim 10, wherein the relationship is a formula of the form $t = a \cdot \log_n(x + b_1) + b_2$, where:
    t is the known thickness profile;
    a is a coefficient related to the metal wall;
    x is the series of composites of received signal measurements;
    $b_1$ and $b_2$ are adjustment factors; and
    n is the base of the log.

15. The method of claim 14, wherein a, $b_1$, and $b_2$ are determined based on the known thickness profile and the series of composites of received signal amplitudes.

16. The method of claim 1, wherein the predetermined relationship is a logarithmic or exponential formula.

17. The method of claim 1, wherein each composite of received signal measurements is a scalar value.

18. The method of claim 10, wherein the predetermined relationship is a logarithmic or exponential formula.

19. The method of claim 10, wherein each composite of received signal measurements is a scalar value.

* * * * *